UNITED STATES PATENT OFFICE.

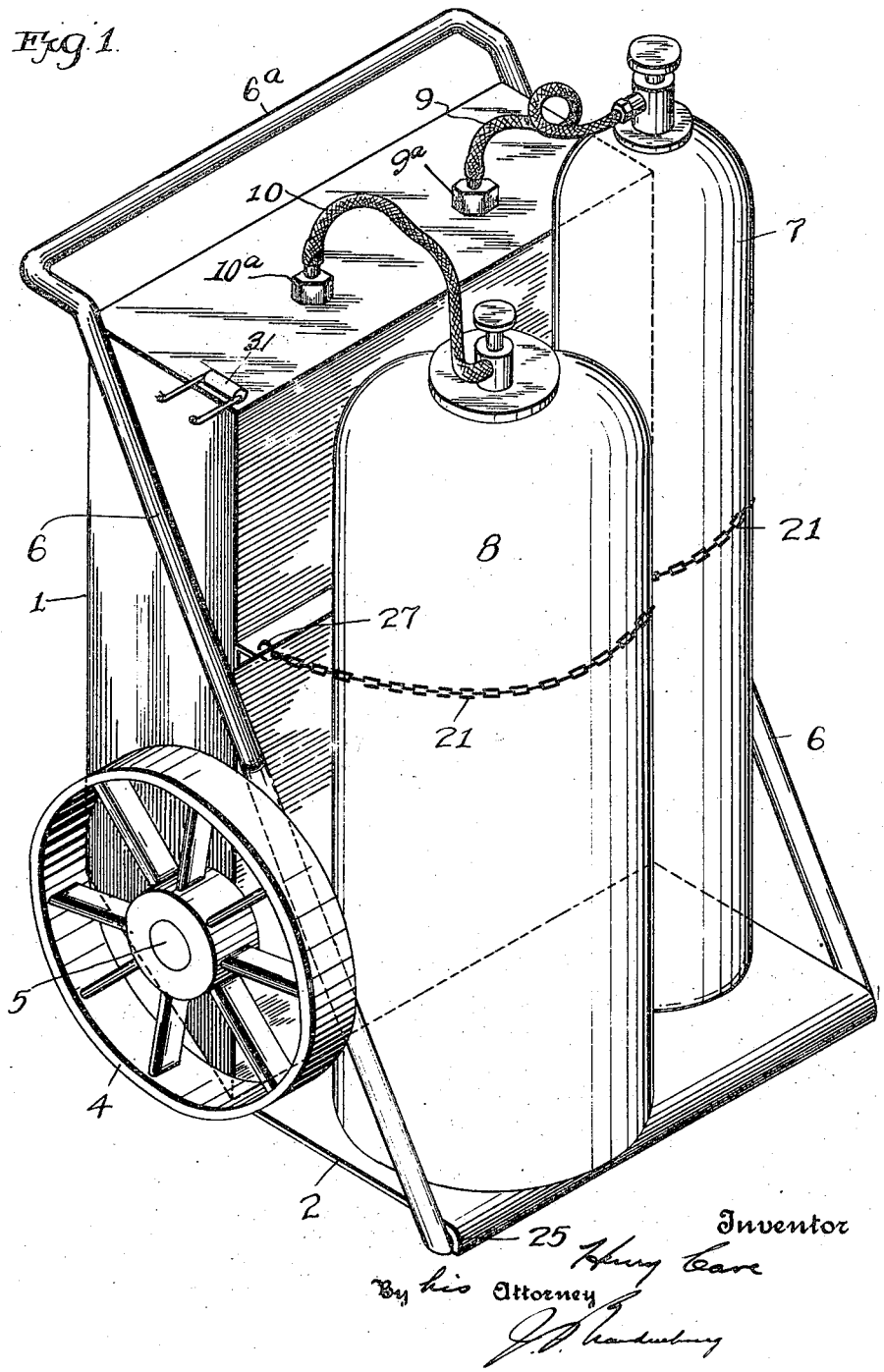

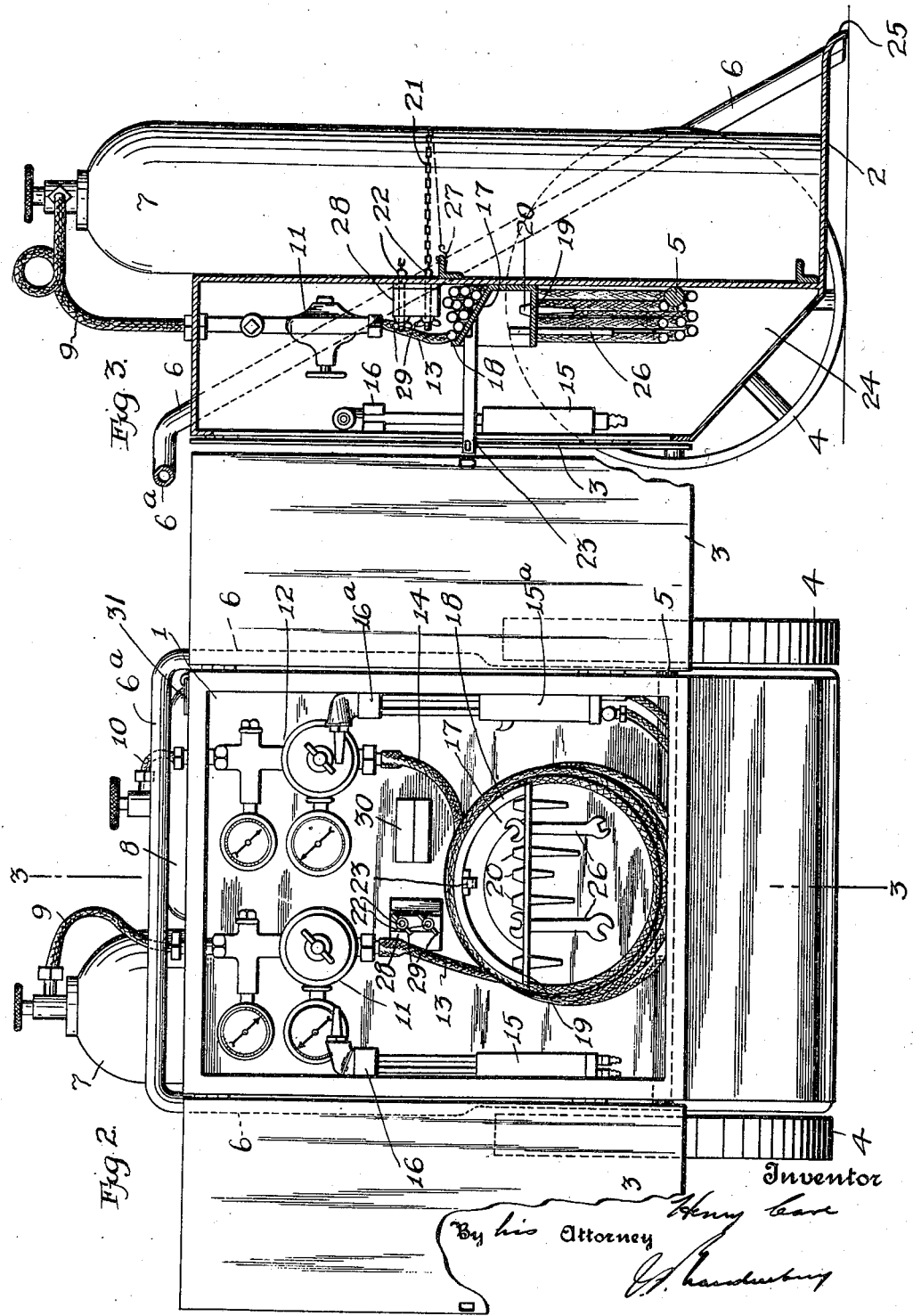

HENRY CAVE, OF ELIZABETH, NEW JERSEY, ASSIGNOR TO DAVIS-BOURNONVILLE COMPANY, OF NEW YORK, N. Y., A CORPORATION OF NEW YORK.

PORTABLE GAS WELDING OR CUTTING EQUIPMENT.

1,244,030.     Specification of Letters Patent.     Patented Oct. 23, 1917.

Application filed April 25, 1917. Serial No. 164,324.

*To all whom it may concern:*

Be it known that I, HENRY CAVE, a citizen of the United States, and a resident of Elizabeth, in the county of Union and State of New Jersey, have invented a new and useful Portable Gas Welding or Cutting Equipment, of which the following is a specification.

The invention comprises an improvement in portable wheeled gas welding or cutting equipments, the object is to provide an outfit of this character which is very compact and convenient as to both transportation and use, cheap to manufacture and strong of construction, and which affords an inclosure and special places for the parts of the apparatus which are ordinarily subject to loss or injury. The gas tanks are supported accessibly on a forwardly projecting rest at the bottom of the cabinet, which rest may also serve to maintain the cabinet and tanks in an upright position when standing, and through connections extending through a a wall of the cabinet are normally connected with the apparatus within. The cabinet can be locked, and the same lock protects the external tanks, clamps for which have their operating means within the inclosure. The outfit is so constructed as to be movable from place to place with the same convenience as a two-wheeled hand truck, the truck frame in this instance, however, being advantageously constituted by the cabinet.

Other features and advantages of the invention will become apparent as the specification proceeds, reference being had to the accompanying drawing wherein:

Figure 1 is a front perspective view of the equipment;

Fig. 2 is a rear elevation, with the door open; and

Fig. 3 is a vertical section on the line 3—3 of Fig. 2.

The cabinet heretofore referred to is designated 1, the same being made strongly of sheet metal construction and provided with a forwardly projecting bottom rest or ledge 2 and with a rear door 3, which may be made in two leaves, as shown. The cabinet is shallow from front to back as compared with its height and width, and is movable upon a pair of carrying wheels 4 with its lower end in proximity to the ground. The axle 5, upon the ends of which these wheels are revolubly mounted, may extend entirely through the cabinet, close behind the front wall thereof, being welded in the openings in the side walls through which it passes. A diagonal handle frame 6 has its side members secured to the upper portions of the side walls of the cabinet, with their upper ends projecting upward and rearward therefrom and connected by a transverse handle bar 6$^a$. The lower portions of the said side members extending forwardly and downwardly in front of the cabinet, and united at their ends to the forward part of the rest 2, brace the latter against the weight of the tanks. The bottom wall of the cabinet being inclined upward and rearward, substantially as shown, enables the structure to be tilted backward when it is moved about, and affords a pocket 24 in which to keep supplies.

The rest 2 serves as a support for two tanks 7 and 8, one for oxygen and the other for acetylene, and has a foot 25 at the front, which coöperates with the wheels to maintain the structure erect when standing. Conduits 9 and 10 pass through and are secured to the top wall of the cabinet, and at their outer ends are detachably connected with the valved outlets of the tanks. Their inner ends within the cabinet are connected with pressure gage and regulator structures 11 and 12, which are fixedly supported by said top wall, and to the outlets of these in turn are attached the inlet ends of a pair of flexible hose pipes 13 and 14. The said conduits preferably comprise lengths of hose, which are secured to connections 9$^a$ and 10$^a$ on the tank wall, these connections being in communication through passage openings in the wall with the pressure regulators permanently mounted in the interior. The outlet ends of the torch hose 13, 14 may be connected interchangeably with the oxygen and acetylene connections at the rear ends of two torches 15, 15$^a$. Of these, one is a welding torch and the other a cutting torch, and, of course, additional torches may be included in the equipment if desired. The nature of such torches is well understood and requires no description.

The torches, when not in use, hang upon holders 16, 16ª upon the inner faces of the side walls. At such times the hose are wound over a semi-circular or arched rest 17, which is secured against and slopes downward toward the front wall of the cabinet and has an upstanding flange 18 upon its rear edge. A perforated shelf 19, disposed immediately beneath this arched rest and within the circle of the hose, constitutes a holder for a plurality of interchangeable torch tips 20 and wrenches 26.

The gas tanks are held in place upon the rest 2 and against the front of the cabinet by flexible clamps 21, which can be loosened only by the operation of screw means within the cabinet, the front wall of the latter being apertured to permit the passage of the clamp terminals. The clamps when drawn up grip the tanks so tightly that the latter cannot be unauthorizedly withdrawn from their embrace, and consequently a lock 23 for the door 3 safeguards both the tanks and the apparatus in the cabinet.

The clamps are preferably made of lengths of chain, one end of each of which is applied over a hook 27 projecting forward from the front wall of the cabinet, while their opposite ends are attached to screw rod terminals 22, which latter pass through the wall and through a block 28 within the cabinet and carry wing nuts 29 at their inner ends. When these wing nuts are turned to tighten the clamps, the opposite ends of the latter are held against disengagement from the hook 27. By loosening the nuts the clamps may be disconnected from the hooks and the exhausted tanks removed and replaced with filled ones.

Additional facilities and equipment may, of course, be included. A shelf or pocket 30 may be provided for holding goggles, and a hinged fork 31, projecting laterally from the top of the cabinet and capable of being folded out of the way, furnishes means for supporting either of the torches outside the inclosure during intervals when not in use.

While the invention has been described with reference to a wheeled embodiment, it will be understood that it is not necessarily so limited in all of its aspects, and that, for example, the feature of the case and therein mounted regulators organized as a permanent unit, connectible through the wall with external sources of supply on the one hand and with a contained torch and flexible hose on the other hand, is susceptible of application in other forms of portable outfits.

What I claim as new is:

1. A cabinet truck for gas welding and cutting equipment, comprising a cabinet shallow from front to back in comparison with its height and width and having a door at the back, a pair of wheels on the cabinet, whereby it is rollingly supported with its lower end near the ground, a rest projecting forward from the lower end of the cabinet adapted to carry gas tanks, and a handle secured to the cabinet, the cabinet constituting a frame for the truck.

2. A wheeled carrier for gas welding and cutting equipment, comprising a cabinet having a door, and an external support for gas tanks, and means for locking said door, in combination with clamps for the tanks on the external support, and operating means for the clamps inside the cabinet.

3. A portable welding and cutting equipment, comprising a wheeled structure, embodying a cabinet with a rest in front of its lower portion, gas tanks on said rest outside the cabinet, apparatus in the cabinet comprising gages, regulators, hose and a torch, the gages and regulators being fixed, connections from the outside tanks to the apparatus inside, and a back door through which the torch may be removed, drawing its hose with it.

4. A cabinet truck for gas welding and cutting equipment, comprising a cabinet shallow from front to back in comparison with its height and width and having a door at the back and an upwardly and rearwardly inclined bottom wall, a pair of wheels whereby the cabinet is rollingly supported with said inclined bottom wall near the ground, a rest projecting forward from the lower end of the cabinet adapted to carry tanks, and a handle at the top and rear of the cabinet.

5. A cabinet truck for gas welding and cutting equipment, comprising a cabinet shallow from front to back in comparison with its height and width and having a door at the back, wheels whereby the cabinet is rollingly supported with its lower end near the ground, a rest projecting forward from the lower part of the cabinet adapted to receive a pair of tanks, and a handle frame having its handle portion projecting upward and rearward from the cabinet and its side members fixed to the cabinet and projecting forwardly and downwardly therefrom and united as braces to the rest.

6. A portable welding and cutting equipment, comprising a cabinet shallow from front to back as compared with its height and width, an external rest for gas tanks, carrying wheels and a handle, the cabinet being provided with a back door, an arched rest for hose secured to the inside of its front wall, and a perforated shelf for torch tips beneath said hose rest.

7. In a portable gas welding and cutting outfit, the combination with a torch and hose, of a case therefor having gas passages through its wall and connections for the attachment of pipes leading from external sources of supply, and pressure regulators, to which the torch hose are attached, mounted fixedly upon the interior of the wall in communication with said gas passages and external connections.

HENRY CAVE.